(12) United States Patent
Smiddy et al.

(10) Patent No.: US 11,472,108 B1
(45) Date of Patent: Oct. 18, 2022

(54) FEED HOUSING PURGE SYSTEM

(71) Applicant: Thermwood Corporation, Dale, IN (US)

(72) Inventors: Brian S. Smiddy, Newburgh, IN (US); Scott G. Vaal, Jasper, IN (US)

(73) Assignee: THERMWOOD CORPORATION, Dale, IN (US)

( * ) Notice: Subject to any disclaimer, the term of this patent is extended or adjusted under 35 U.S.C. 154(b) by 0 days.

(21) Appl. No.: 17/513,125

(22) Filed: Oct. 28, 2021

(51) Int. Cl.
| | | |
|---|---|---|
| *B29C 64/329* | (2017.01) | |
| *B29C 64/35* | (2017.01) | |
| *B29C 64/209* | (2017.01) | |
| *B33Y 40/00* | (2020.01) | |
| *B29C 64/153* | (2017.01) | |
| *B29C 64/255* | (2017.01) | |
| *B33Y 30/00* | (2015.01) | |
| *B29C 64/314* | (2017.01) | |

(52) U.S. Cl.
CPC .......... *B29C 64/329* (2017.08); *B29C 64/153* (2017.08); *B29C 64/209* (2017.08); *B29C 64/255* (2017.08); *B29C 64/314* (2017.08); *B29C 64/35* (2017.08); *B33Y 30/00* (2014.12); *B33Y 40/00* (2014.12)

(58) Field of Classification Search
CPC .... B22F 10/12–18; B22F 10/14; B22F 10/20; B22F 10/22–28; B22F 10/70–73; B22F 12/50–58; B22F 3/00; B29C 64/106; B29C 64/118; B29C 64/153; B29C 64/165; B29C 64/209; B29C 64/255; B29C 64/307–336; B29C 64/314; B29C 64/329; B29C 64/35; B29C 64/357; B33Y 30/00; B33Y 40/00
See application file for complete search history.

(56) References Cited

U.S. PATENT DOCUMENTS

| | | | | |
|---|---|---|---|---|
| 3,123,107 | A | * | 3/1964 | Kappler ............... B65D 90/626 141/90 |
| 5,764,521 | A | * | 6/1998 | Batchelder ............. B29C 48/92 425/149 |
| 7,731,816 | B2 | | 6/2010 | Oldani et al. |
| 7,810,539 | B2 | | 10/2010 | Mischler et al. |
| 8,151,854 | B2 | | 4/2012 | Oldani |
| 8,185,229 | B2 | * | 5/2012 | Davidson ................ B29C 64/35 700/118 |
| 8,534,338 | B2 | | 9/2013 | Oldani et al. |

(Continued)

OTHER PUBLICATIONS

Sloan, "Big additive machines tackle large molds," CompositesWorld, Jun. 11, 2019, (8 pages).

*Primary Examiner* — Manley L Cummins, IV
(74) *Attorney, Agent, or Firm* — Bookoff McAndrews, PLLC

(57) ABSTRACT

An additive manufacturing apparatus includes a material container having a hollow interior configured to receive a material and an extruder connected below the material container to receive the material from the material container. The additive manufacturing apparatus includes a material removal device including an actuator configured to activate the material removal device to dislodge retained material from within the hollow interior of the material container and a drain passage configured to receive the dislodged material and guide the material to an exterior of the additive manufacturing apparatus.

14 Claims, 5 Drawing Sheets

(56) References Cited

U.S. PATENT DOCUMENTS

| | | |
|---|---|---|
| 8,954,180 B2 | 2/2015 | Oldani |
| 2007/0044899 A1 | 3/2007 | Tingley |
| 2008/0006017 A1 | 1/2008 | Rindels |
| 2010/0200168 A1 | 8/2010 | Oldani et al. |
| 2013/0333798 A1* | 12/2013 | Bosveld ................ B29C 64/329 |
| | | 141/2 |
| 2015/0298397 A1* | 10/2015 | Chen ...................... B01D 36/00 |
| | | 209/12.2 |
| 2018/0050502 A1 | 2/2018 | Oldani |
| 2019/0322044 A1* | 10/2019 | Susnjara ............... B29C 64/209 |
| 2019/0366628 A1* | 12/2019 | Guillory ............... B29C 64/209 |
| 2020/0122392 A1* | 4/2020 | Townsend .............. B33Y 50/02 |
| 2021/0060863 A1* | 3/2021 | Rudolph ............... B29C 64/336 |
| 2021/0101336 A1* | 4/2021 | Susnjara ............... B29C 64/227 |

\* cited by examiner

FEED HOUSING PURGE SYSTEM

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, which may be referred to as 3D printing manufacturing techniques or processes.

BACKGROUND

Additive manufacturing techniques and processes generally involve the buildup of one or more materials to make a net or near net shape (NNS) object, in contrast to subtractive manufacturing methods. While "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer-aided design (CAD) model.

One such process, referred to as Fused Deposition Modeling (FDM) comprises melting a very thin layer of thermoplastic material, and applying this material in layers to produce a final part. This is commonly accomplished by passing a continuous thin filament of thermoplastic material through a heated nozzle, which melts the material and applies it to the structure being printed. The heated material is applied to the existing structure in thin layers, melting and fusing with the existing material to produce a solid finished product.

The filament used in the aforementioned process is generally produced using a plastic extruder, which includes a specially-designed steel screw that rotates inside a heated steel barrel. Thermoplastic material in the form of small pellets is introduced into one end of the rotating screw. Friction from the rotating screw, combined with heat from the barrel, softens the plastic, which is then forced under pressure through a small round opening in a die attached to the front of the extruder barrel. This extrudes a string of material, which is cooled and coiled up for use in the 3D printer.

Melting a thin filament of material in order to 3D print an item is a slow process, which is generally suitable for producing relatively small items and/or relatively few items. Therefore, while processes of 3D printing using molten thermoplastic materials offer advantages, especially for large parts, the melted filament approach to 3D printing can be too slow for large items or for producing a large number of items.

The process of 3D-printing a part, examples of which utilize a large print bead to achieve a desired final size and shape, can involve a two-step process. This two-step process, referred to as near-net-shape, begins by printing a part to a size slightly larger than needed, then machining, milling, or routing the part to the final desired size and shape. While additional time is necessary to trim the part to its final size, the ability to employ a faster printing process results in a printing process that is faster overall.

Large-scale print heads used to print thermoplastic material in large beads can include a vertically-mounted plastic extruder and a print nozzle, which direct a round print bead downward onto the part being printed. In some cases, flowable material, such as, molten thermoplastic material, may be infused with a reinforcing material (e.g., strands of fiber) to enhance the material's strength. The flowable material, while generally hot and pliable, may be deposited upon a substrate (e.g., a mold), pressed down or otherwise flattened to some extent, and leveled to a consistent thickness. One version of this process involves an oscillating plate surrounding the print nozzle which oscillates vertically to flatten the print bead against the previous layer of material. An improved version of this uses a tangentially compensated roller mechanism which is efficient at joining and squeezing out air from between the layers. The deposition process may be repeated so that each successive layer of flowable material is deposited upon an existing layer to build up and manufacture a desired component structure. In order to achieve proper bonding between printed layers, the temperature of the layer being printed upon is controlled to be within a certain range. For example, this temperature should be sufficiently cool to have solidified by an amount that enables the deposited layer to support the pressures generated by the application of the next layer, but also sufficiently warm to soften and fuse with the new layer, thus producing a solid part such as a mold.

Large plastic extruders can use a continuous supply of plastic pellets for 3D printing. These large plastic extruders may be supplied with plastic pellets by a vacuum delivery system. In some vacuum delivery systems, vacuum is used to convey plastic pellets from the bottom of a large hopper mounted on the floor to a smaller-scale vacuum receiver and smaller hopper. The small-scale vacuum receiver and associated hopper can be mounted above the extruder so the plastic pellets can freely flow out from the bottom of the smaller hopper into the extruder. However, when changing material types, it is desirable to empty all the material present in the small vacuum receiver, hopper, extruder supply line, and drain line. The removal of material from each of these components avoids cross-contamination of print materials, which can cause a high-value printed part to be unusable.

Despite efforts to remove material when changing material types, static forces, friction, and other factors can cause some of the material to remain in place, potentially resulting in incomplete removal of the material being removed as part of the material changeover. Additionally, retained material can be present in the vacuum receiver, with some material remaining in the receiver, even when a slide gate is opened to empty the hopper. This remaining material cannot easily be manually cleaned out due to the elevated height of the hopper with respect to floor level. Additionally, material changeover cannot be manually performed while the manufacturing machine is operating, which is frequently the case.

SUMMARY

Aspects of the present disclosure relate to, among other things, methods and apparatus for fabricating components via additive manufacturing or 3D printing techniques. Each of the aspects herein may include one or more of the features described in connection with any of the other disclosed aspects. An exemplary object of this disclosure is an approach in which compressed gas (e.g., air) is forcefully injected into a material flow during a material unloading process to completely empty out the system, therefore reducing or eliminating cross-contamination during material changeovers. In at least some aspects of the disclosure, forces (e.g., vibration forces) may be applied to one or more components of the system, in addition to or instead of compressed gas.

A vacuum may be used to pull plastic pellets from the bottom of a first (e.g., relative large) hopper mounted to the floor, and draw these pellets into a smaller vacuum receiver and second (e.g., smaller) hopper mounted above the extruder. The plastic pellets may flow freely from the hopper down a supply line, also referred to herein as a supply/drain line, and into the extruder. The supply/drain line may divert into two path or form an inverted "Y"-shaped path (e.g., at a position immediately upstream of the extruder), with one branch diverting toward the extruder and other branch extending downward to a slide gate.

To facilitate a material changeover, a print head of an additive manufacturing apparatus may move to a predetermined position for receiving unused retained material (e.g., a dump station). With the print head at this position, a slide gate may open to drain the vacuum receiver, hopper, and a supply/drain line of this material via an opening at a distal end of the drain line. While this occurs, compressed gas may be forcefully injected into the system. This compressed gas may be cycled between activated and deactivated states (e.g., in response to commands generated by controller 2) to dislodge any remaining plastic pellets by creating a turbulent flow of gas. The print head may then move away from the dump station. The extruder, which may operate at a slow speed during the opening of the slide gate and injection of compressed gas, may continue to operate to empty material from a relatively short section or path of the supply line. For example, the extruder may remove all material from a leg of an inverted "Y"-shaped passage or pipe of the supply/drain line upstream of the extruder, and may deposit this material at the dump station. This process may be repeated by returning the print head to the position over the dump station, opening the slide gate, and repeating a step of forcefully injecting compressed into the system, while cycling the injected gas on and off repeatedly, to dislodge any remaining plastic pellets and deposit these pellets at the dump station via the drain line.

In one aspect, an additive manufacturing apparatus may include a material container having a hollow interior configured to receive a material and an extruder connected below the material container to receive the material from the material container. The additive manufacturing apparatus may include a material removal device including an actuator configured to activate the material removal device to dislodge retained material from within the hollow interior of the material container and a drain passage configured to receive the dislodged material and guide the material to an exterior of the additive manufacturing apparatus.

In another aspect, an additive manufacturing system may include a material container having a hollow interior configured to receive a thermoplastic material, and an extruder configured to receive the thermoplastic material from the to a material deposition nozzle. The additive manufacturing system may include a material removal device including an actuator configured to release energy so as to dislodge retained material from within the hollow interior of the material container and a controller configured to actuate the actuator of the material removal device.

In yet another aspect, a method for removing material from an additive manufacturing apparatus may include supplying a first material from a material container of the additive manufacturing apparatus to an extruder, and depositing an amount of the first material with the extruder to form at least a portion of a part. The method may include activating an actuator of a material removal device to remove a retained amount of the first material from an interior the material container such that the retained amount of the first material exits the additive manufacturing apparatus by bypassing the extruder.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing or 3D printing techniques. Specifically, at least some of the methods and apparatus described herein comprise an approach that uses compressed gas (e.g., air) forcefully injected into a path where material flows during a process for unloading a first material to completely empty the system of this material in preparation for the introduction of a second material that is different from the first material. In at least some disclosed aspects, the injection of gas may help eliminate cross-contamination during material changeovers.

Figure 1:
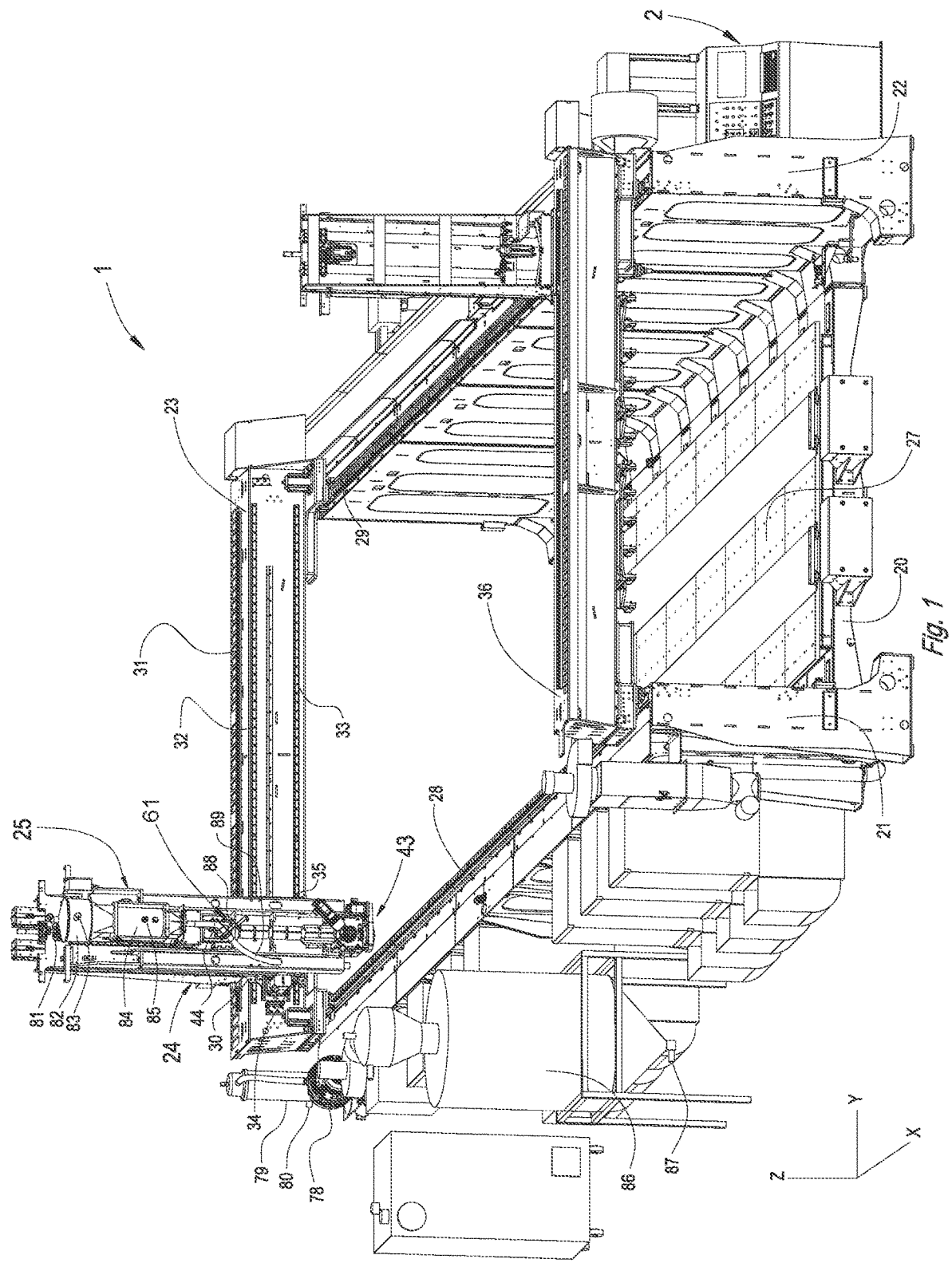
FIG. 1 is a perspective view of an exemplary additive manufacturing apparatus or CNC machine operable according to an additive manufacturing process for forming articles, according to an aspect of the present disclosure.

With reference to FIG. 1, additive manufacturing apparatus 1 (e.g., a CNC machine) may be part of an additive manufacturing system including a control system or controller 2 configured to generate commands for controlling CNC machine 1 and/or a material removal device to perform each of the functions described herein. Additive manufacturing apparatus 1 may include a bed 20 secured between a pair of transversely spaced side walls 21 and 22. Apparatus 1 may also include a printing gantry 23 supported on side walls 21 and 22, a carriage 24 mounted on printing gantry 23, a carrier 25 mounted on carriage 24, an extruder 61, and an applicator assembly or applicator head 43 mounted on carrier 25. A horizontal worktable 27, which may include a support surface, is disposed so as to extend in an x-y plane and is supported on bed 20 between side walls 21 and 22. Printing gantry 23 may be disposed along a y-axis, supported at a pair of opposing ends thereof by side walls 21 and 22. Printing gantry 23 may be secured to a pair of guide rails 28 and 29 provided on the upper ends of side walls 21 and 22. The printing gantry 23 may be displaceable along an x-axis and rails 28 and 29 by a pair of servomotors mounted on printing gantry 23 and operatively connected to tracks provided on side walls 21 and 22 secured to bed 20. Carriage 24 may be supported on printing gantry 23 and provided with a support member 30 mounted on and displaceable with respect to one or more guide rails (e.g., guide rails 31, 32, and 33) secured to printing gantry 23. For example, carriage 24 may be displaceable along a y-axis by sliding on one or more of rails 31, 32, and 33. This sliding motion may be caused by actuation of a servomotor mounted on printing gantry 23 and operatively connected to support member 30. Carrier 25 may be mounted on a set of spaced apart, vertically-extending disposed guide rails 34 and 35. Guide rails 34 and 35 may be supported on carriage 24 for displacement of carrier 25 relative to carriage 24 and components connected to carrier 25, along a z-axis. Carrier 25 may be displaceable along the z-axis by a servomotor mounted on carriage 24 and operatively connected to carrier 25.

Figure 2:
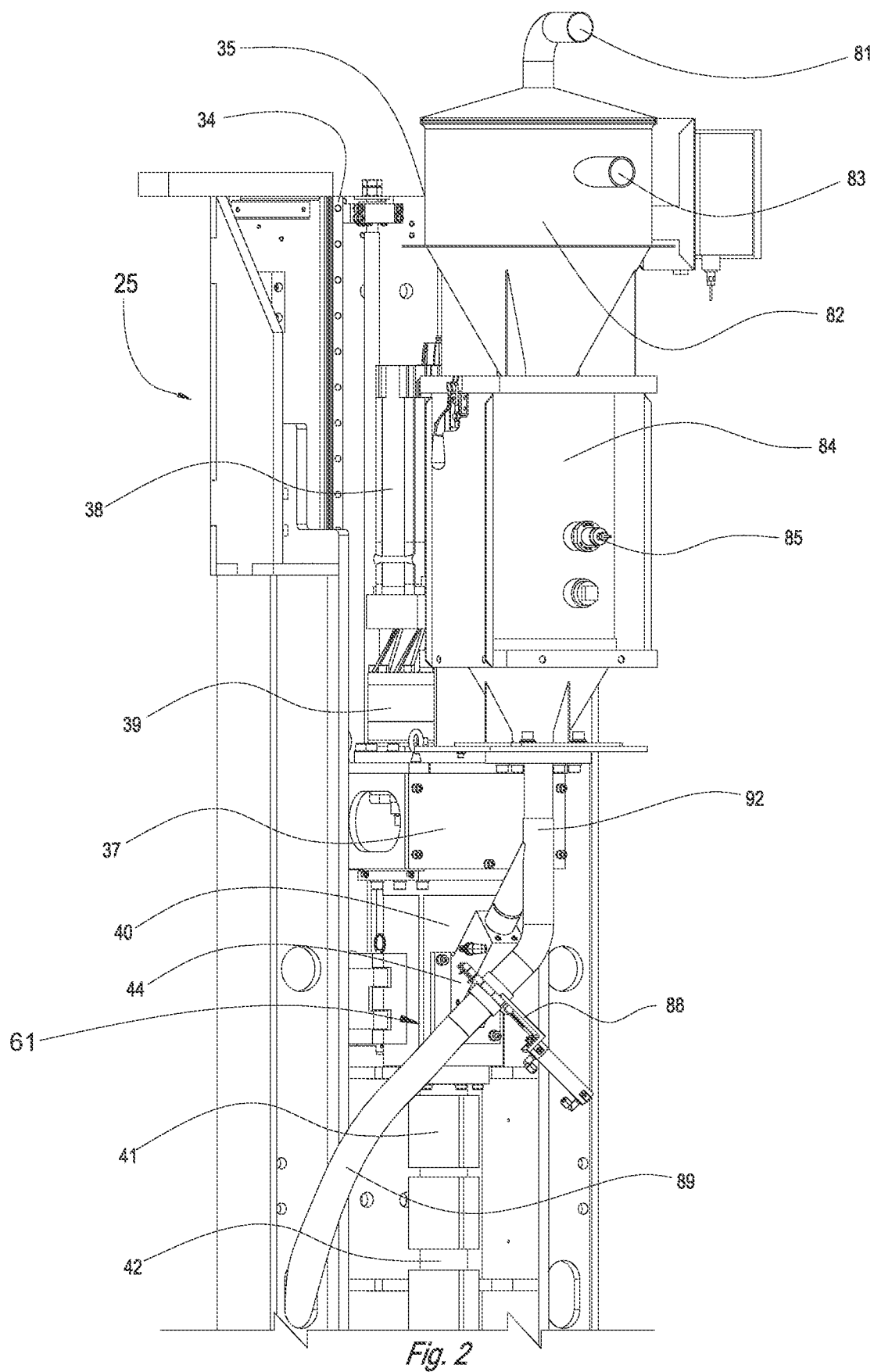
FIG. 2 is a perspective view of an exemplary carrier, vacuum receiver, hopper, and extruder assembly of the exemplary additive manufacturing apparatus shown in FIG. 1.

As shown in FIG. 2, an extruder 61 may be mounted to carrier 25 on an additional set of rails 34 and 35 and bearings. Extruder 61 may be linearly slidable along these rails 34 and 35 so as to be movably mounted on carrier 25. Extruder 61 may be driven by a servomotor 38 through a gearbox 39 which is attached to a transition housing 37. Extruder 61 may receive thermoplastic pellets, or other material, from a hopper 86 (FIG. 1). This material may be conveyed to an elevated hopper 84 from hopper 86. Hopper 84 may be configured to gravity-feed pellets to a feed throat 44 attached to feed housing 40. These pellets may be received by extruder 61 via feed throat 44 and may be transferred by an extruder screw of extruder 61 and down through barrel 42 where the material is melted by the friction of the extruder screw and heat generated with one or more heaters 41. Extruder 61 may be configured to cause melted thermoplastic material to flow to a positive displacement melt pump or gear pump 62 (FIG. 3).

Figure 3:
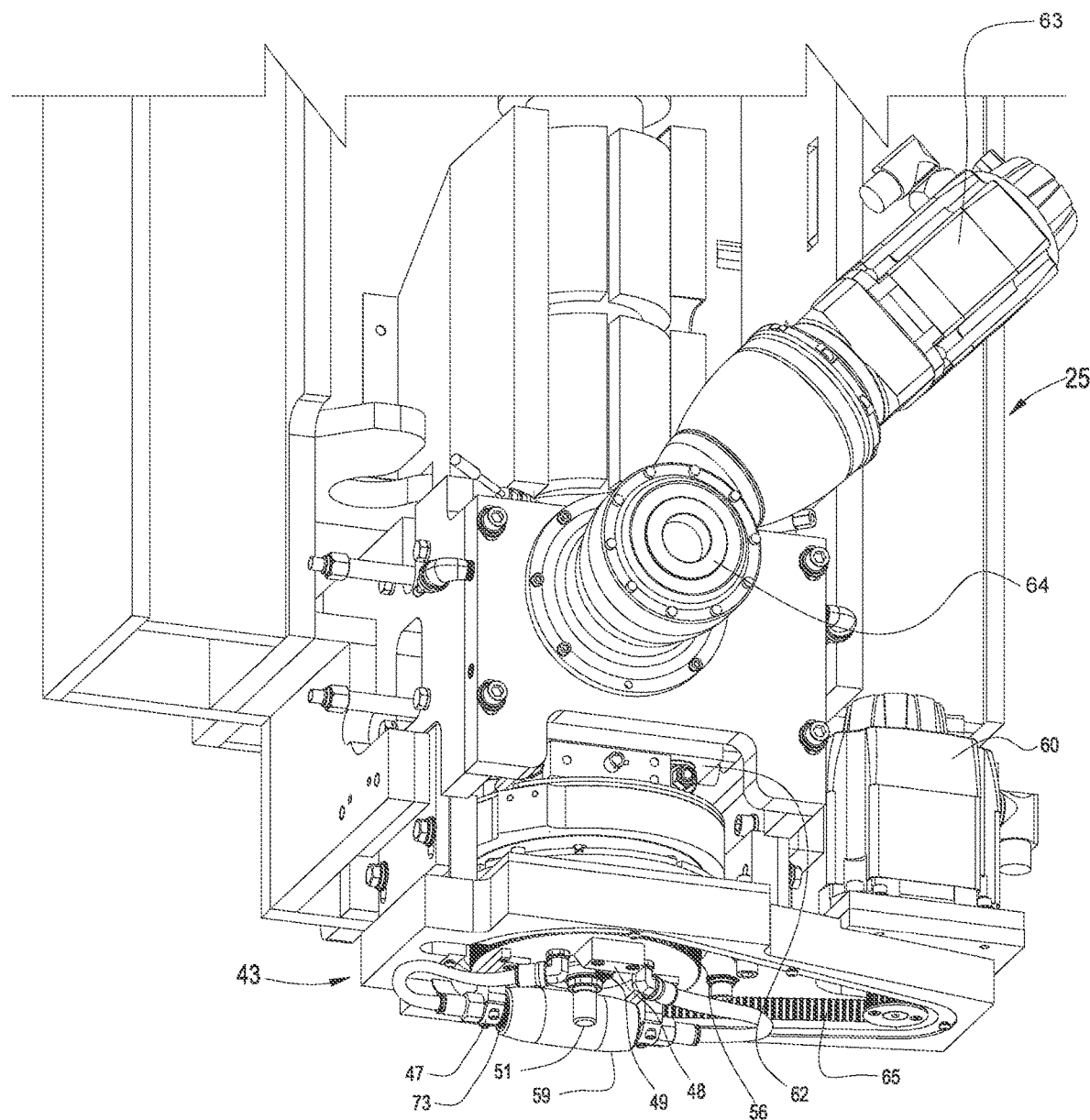
FIG. 3 is an enlarged perspective view of an exemplary carrier and applicator assembly of the exemplary additive manufacturing apparatus shown in FIG. 1.

As shown in FIG. 3, gear pump 62 may be securely mounted to the bottom of carrier 25. Gear pump 62 may be driven by a servomotor 63, through a gearbox 64. Gear pump 62 may receive molten plastic from extruder 61 (FIG. 2), and supply precisely metered thermoplastic material at predetermined flow rates to nozzle 51 to print the part. Applicator head 43 may be attached below gear pump 62 so as to be downstream of extruder 61 and gear pump 62 to receive thermoplastic material from extruder 61 and gear pump 62. A bead-shaping roller 59 may also be mounted below gear pump 62 on applicator head 43. Roller 59 may be rotationally mounted to a carrier bracket 47, so as to provide a mechanism for flattening and leveling a significantly oversized bead of fluid material (e.g., molten thermoplastic) extruded out the considerably sizeable nozzle 51. Carrier bracket 47 may be rotationally displaced by a servomotor 60, through a pulley or sprocket 56 connected to servomotor 60 by a belt or chain 65 arrangement.

Figure 4:
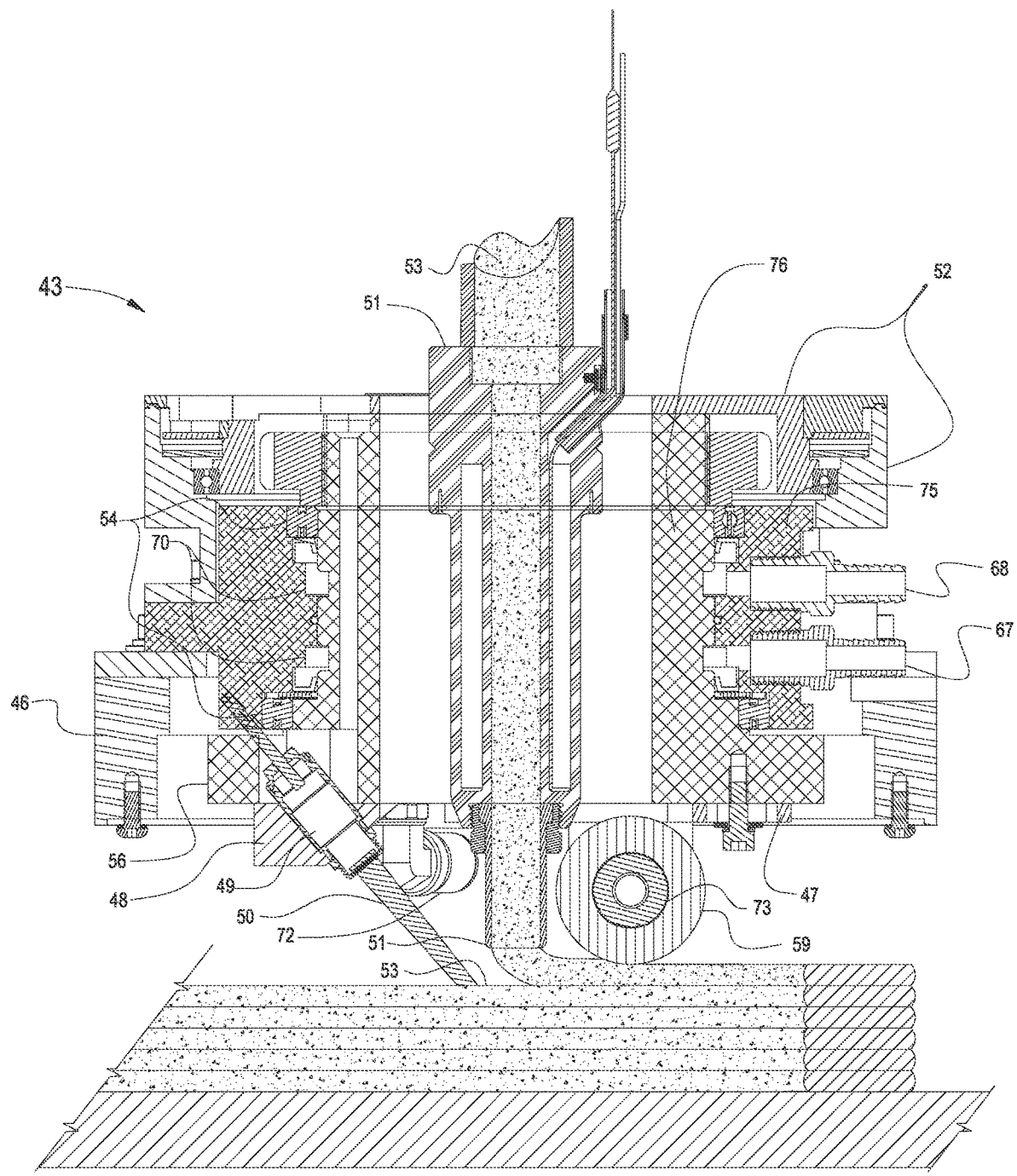
FIG. 4 is an enlarged cross section view of an exemplary applicator assembly shown in FIG. 3.

With reference to FIG. 4, applicator head 43 may include a housing 46 with a rotary union mounted therein. The rotary union may include barb fittings 67 and 68, which are ported into coolant passages 70 that encompasses inner hub 76 and the inside of outer housing 75 of the rotary union. Coolant passages 70 may continue through quick disconnect fittings 72 into axle 73 of compression roller 59. Pulley or sprocket 56 may be machined into inner hub 76 of the rotary union. Inner hub 76 may have an opening with a diameter sized to allow print nozzle 51 to pass through it. Inner hub 76 may rotate on a set of bearings 54 contained in outer housing 75 of the rotary union. A compression roller assembly may include a roller 59 and a temperature sensor 49 with a mounting block 48. Roller 59 and sensor 49 may be attached to inner hub 76 of the rotary union so that compression roller 59 and temperature sensor 49 are configured to rotate about print nozzle 51. Temperature sensor 49 may be configured to detect the temperature of the previously printed layer 53 at a point in time just before the next layer is added. An exemplary sensing beam 50 (e.g., representing laser light, infrared light, etc.), may allow temperature sensor 49 to detect the temperature of layer 53.

As shown in FIGS. 2-4, an oversized molten bead of a flowable material (e.g., molten thermoplastic) may be deposited, under pressure, from a source disposed on carrier 25 (e.g. gear pump 62) or another source. The bead of flowable material may be provided to applicator head 43. For example, gear pump 62 (or another source of flowable material), may be securely connected to, and in communication, with nozzle 51. In use, flowable material 53 (e.g., thermoplastic material) may be heated sufficiently to form a large molten bead, which may be extruded through applicator nozzle 51 to form large, uniform, smooth rows of deposited material on surface 27. Such beads of molten material may be flattened, leveled, and/or fused to adjoining layers by bead-shaping compression roller 59, with the layers forming 3D printed products. The use of roller 59 to flatten, level, and/or fuse layers may substantially eliminate the occurrence of trapped air between the adjoining layers.

Figure 5:
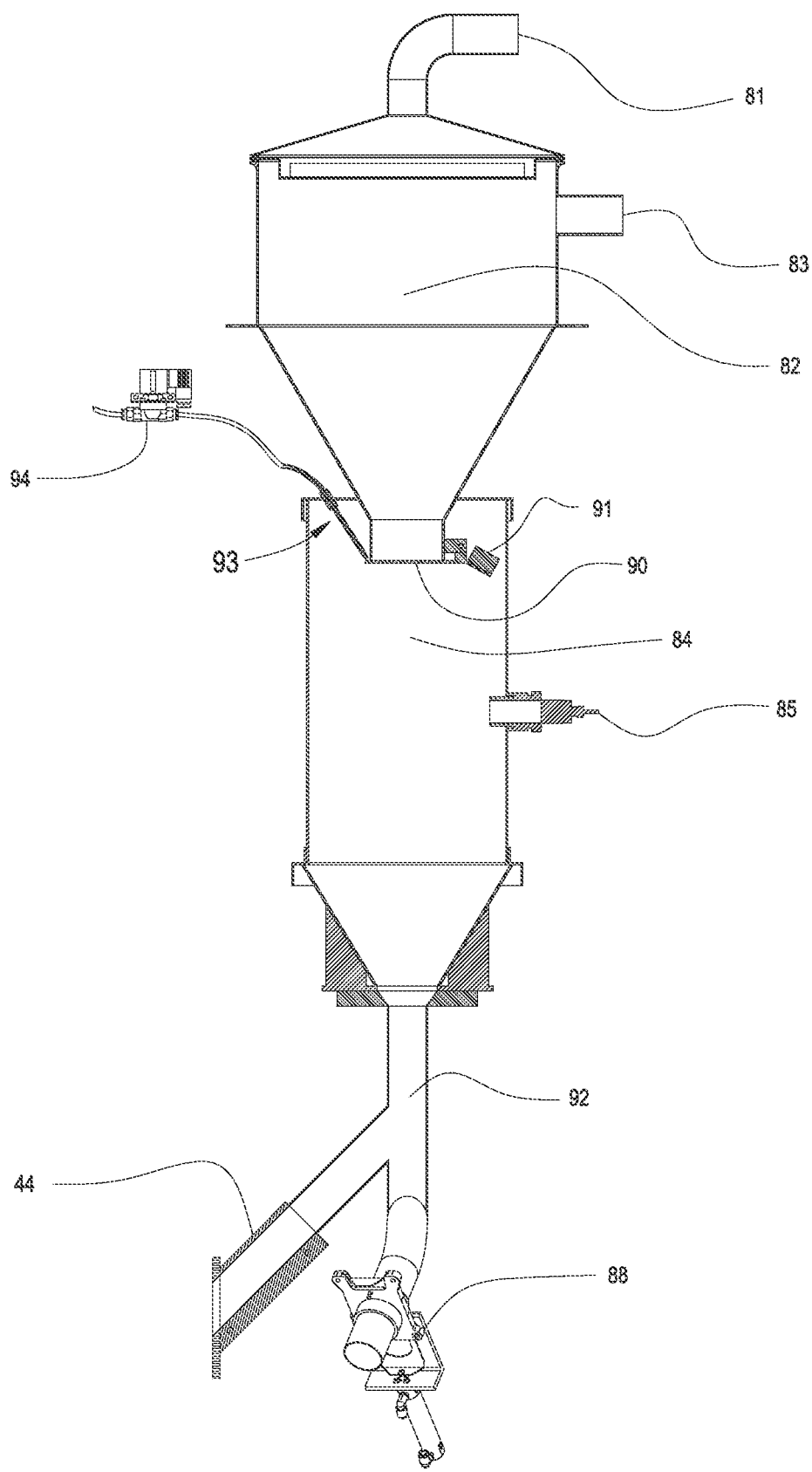
FIG. 5 is a cross-sectional view of an exemplary material removal device useful with a vacuum receiver, hopper, and/or supply/drain line of the additive manufacturing apparatus shown in FIG. 1.

FIG. 5 illustrates an exemplary material supply and purge assembly that may facilitate a material changeover process. The material supply and purge assembly may include a vacuum receiver 82 (an exemplary material container), hopper 84 (an exemplary material container), supply/drain line 92, and a material removal device that includes an actuator, such as a solenoid valve 94 and a material blow off nozzle 93. Solenoid valve 94 may be a normally-closed pneumatic solenoid valve that, when open, facilitates the release of energy to dislodge retained material. For example, solenoid valve 94 may be actuated to allow flow pressurized gas to nozzle 93, and prevent this flow when closed. The material removal device (pneumatic solenoid valve 94 and material blow off nozzle 93) may respond to commands from controller 2 to remove remaining material from hopper 84.

As part of an additive manufacturing process performed with apparatus 1, a first material may be provided as pellets via hoppers 84 and 86, supplied to extruder 61 via supply/drain line 92, melted by extruder 61 as described above, and deposited via nozzle 51 to form at least a portion of a part. When the part is complete, or when it is otherwise desirable to deposit a second material that is different than the first, a material changeover process, described below, may be performed. During a material changeover, the material removal device may ensure that the first material is fully removed from apparatus 1 (e.g., to an exterior of vacuum receiver 82, hopper 84, supply/drain line 92, extruder 61, gear pump 62, and other components of additive manufacturing apparatus 1) prior to introduction of the second material to extruder 61 and/or to vacuum receiver 82.

With reference to FIG. 1, when additive manufacturing apparatus 1 performs a printing process, a vacuum may be created by vacuum pump 78. Vacuum pump 78 may be any suitable pump configured to generate a vacuum sufficient to draw material from hopper 86 to hopper 84 via vacuum receiver 82. Vacuum pump 78 may be connected to a fine filter 79 and outlet port 80. A vacuum hose (not shown) may connect vacuum port 80 of vacuum pump 78 to a vacuum-receiving port 81 of vacuum receiver 82 to place vacuum pump 78 in fluid communication with the interior of vacuum receiver 82. A supply hose (not shown) may connect port 87 of hopper 86 to port 83 of vacuum receiver 82 to facilitate a flow of pellets from hopper 86 to an interior of vacuum receiver 82.

With reference to FIG. 5, vacuum receiver 82 may have a hollow interior configured to receive plastic pellets and transport these pellets to a hollow interior of hopper 84. For example, vacuum receiver 82 may extend to the interior of hopper 84 and may include, at a bottom portion thereof, a positionable flapper valve 90 and counterweight 91. Port 81 and port 83 of vacuum receiver 82 may be separated by a fine screen or filter positioned within vacuum receiver 82 to prevent pellets from traveling upward into port 81.

Hopper 84 may store pellets fed by gravity from vacuum receiver 82, which travel to extruder 61 via supply/drain line 92 and feed throat 44. A sensor 85, in communication with controller 2, may be secured to hopper 84 to detect a quantity of material within hopper 84. Supply/drain line 92 may include a plurality of paths or branches, including a first branch extending to feed throat 44 for supplying material to extruder 61 and a second branch that includes a slide gate 88 for draining material by bypassing extruder 61.

As described above, pump 78 may be operated to apply vacuum to the interior of vacuum receiver 82 via port 81, causing material, such as plastic pellets, to enter port 83 to supply material to additive manufacturing apparatus 1 during a printing process. After an appropriate period of time, pump 78 may be deactivated, allowing the weight of accumulated material within the hollow interior of vacuum receiver 82 to act against counterweight 91 and open flapper valve 90. Pump 78 may be reactivated, and this supply process repeated, when a signal generated by sensor 85 indicates that a quantity or level of material in hopper 84 is below a predetermined level (e.g., hopper 84 is not full).

When the part is completed, or when it is otherwise desirable to remove material from components of the additive manufacturing system (e.g., vacuum receiver 82, hopper 84, supply/drain line 92, feed throat 44, and extruder 61), a material removal process, which may include material changeover, may be performed. This process may include positioning a drain line 89 (FIG. 2) at a dump station or other predetermined position for receiving unused material. Slide gate 88 may be controlled, for example by an electrically-actuated (e.g., solenoid-actuated) air cylinder. When opened, slide gate 88 may allow material to drain from supply/drain line 92 and exit additive manufacturing apparatus 1. For example, as shown in FIG. 2, a tube or drain line 89 may extend generally downward from slide gate 88 to allow material to exit from a distal opening of line 89 (not shown) positioned at the dump station.

In some aspects, material may tend to adhere to a surface of flapper valve 90 and/or to other components, such as vacuum receiver 82 and hopper 84. To facilitate the removal of this material, controller 2 may activate solenoid valve 94 to provide a flow of compressed gas toward flapper valve 90. In some aspects, solenoid valve 94 may repeatedly open and close to provide a series of bursts of compressed gas to flapper valve 90 via an opening of nozzle 93. This opening of nozzle 93 may be positioned so as to face a surface of flapper valve 90, e.g., when flapper valve 90 is in a closed position as shown in FIG. 5. The expulsion of pressurized gas may create bursts of force that act to dislodge material attached to walls of vacuum receiver 82 (e.g., a surface of flapper valve 90). The dislodged material may exit supply/drain line 92 via slide gate 88, where this material exits apparatus 1 via bottom drain line 89, as described above.

In some aspects, pressurized or compressed gas expelled from nozzle 93 may strike the flapper of valve 90 with sufficient force to cause flapper valve 90 to open, allowing compressed gas to be diverted upward to the interior of vacuum receiver 82, as well as downward to a lower portion of the interior of hopper 84 and into supply/drain line 92. This compressed gas may travel within these components of additive manufacturing apparatus 1 to dislodge retained material from one or more of vacuum receiver 82, flapper valve 90, hopper 84, or supply discharge line 92.

Following the introduction of compressed gas to the interior of vacuum receiver 82, hopper 84, and supply/drain line 92, and removal of retained material via slide gate 88, controller 2 may cause slide gate 88 to close. Controller 2 may then cause the print head of additive manufacturing apparatus 1 to move such that extruder 61 (FIG. 2) is positioned at the dump station. With extruder 61 positioned above dump station, extruder 61 may operate to advance material, thereby removing material from supply/drain line 92, feed throat 44, extruder 61, gear pump 62, and nozzle 51. Simultaneously, the actuator of the material removal device (e.g., solenoid valve 94) may be cycled, as described above, to release bursts of compressed gas to dislodge stuck material.

In some aspects, extruder 61 may continuously operate at a relatively slow speed. Thus, when extruder 61 is positioned above the dump station, material may be removed by extruder 61 and received by the dump station. In some aspects, the actuation of extruder 61 may facilitate removal of material from feed throat 44 and from the corresponding branch of the "Y"-shaped section of supply/drain line 92.

Following the removal of material via extruder 61, additive manufacturing apparatus 1 may be repositioned such that an opening of drain line 89 is again positioned at the dump station. Once at this position, slide gate 88 may re-open. With slide gate 88 open, controller 2 may actuate solenoid valve 94 to facilitate the re-introduction of pressurized gas from blow off nozzle 93 to remove any remaining material.

While the above-described material removal process was described with steps in an exemplary order, as understood, these steps may be performed in any desired order, including being repeated in any order, in a material removal process. Additionally, one or more of these steps may be omitted without departing from the present disclosure.

While the above-described system and method may employ compressed gas (e.g., air) released with a material removal device to dislodge adhered pellets or other material, other mechanisms that release other types of energy may be employed instead of, or in addition to, a compressed gas mechanism. For example, in at least some aspects, the material removal device may include a vibration-generating system that, when actuated, generates sufficient vibrations in vacuum receiver 82, hopper 84, and/or supply/drain line 92 so as to dislodge material from one or more of these components. In at least some aspects, the material removal device may include a fan that is ported so as to direct gas (e.g., air) to an interior of, for example, hopper 84.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing apparatus, comprising:
a material container having a hollow interior configured to receive a material formed as a plurality of pellets;
an extruder connected below the material container to receive the material from the material container;
a material removal device including a nozzle and a valve configured to direct compressed gas through the nozzle to dislodge material from within the hollow interior of the material container; and
a drain passage configured to receive the dislodged material and guide the dislodged material to an exterior of the additive manufacturing apparatus.

2. The additive manufacturing apparatus of claim 1, wherein the material container is a vacuum receiver having a valve movable between a closed position that is configured to retain the material and an open position that is configured to release the material.

3. The additive manufacturing apparatus of claim 2, wherein the material removal device extends within a hopper.

4. The additive manufacturing apparatus of claim 3, wherein the nozzle is configured to direct the compressed gas such that the gas travels within the vacuum receiver, the hopper, and the drain passage.

5. The additive manufacturing apparatus of claim 2, wherein the nozzle has an opening that faces the valve of the vacuum receiver.

6. The additive manufacturing apparatus of claim 1, wherein the drain passage includes a first path configured to supply the material to the extruder and a second path configured to bypass the extruder.

7. The additive manufacturing apparatus of claim 1, further including a controller configured to activate a gate to cause the dislodged material to bypass the extruder via the drain passage.

8. The additive manufacturing apparatus of claim 1, further including a vacuum pump that, when activated, is configured to supply a second material to the material container.

9. The additive manufacturing apparatus of claim 1, wherein the material removal device is configured to release the compressed gas in a series of bursts through the nozzle and towards the material container.

10. An additive manufacturing system, comprising:
a material container having a hollow interior configured to receive a thermoplastic material formed as a plurality of pellets;
an extruder configured to receive the thermoplastic material from the material container, melt the thermoplastic material, and supply the thermoplastic material to a material deposition nozzle;
a material removal device including a nozzle and a valve configured to release compressed air through the nozzle of the material removal device to dislodge material from within the hollow interior of the material container;
a drain passage configured to receive the dislodged material and guide the dislodged material to bypass the extruder; and
a controller configured to actuate the valve of the material removal device.

11. The additive manufacturing system of claim 10, wherein the controller is configured to repeatedly actuate the valve of the material removal device so as to generate a series of bursts of the compressed air from the nozzle of the material removal device.

12. The additive manufacturing system of claim 11, wherein the nozzle of the material removal device is positioned within the material container.

13. The additive manufacturing system of claim 10, wherein the controller is configured to activate a gate to cause the dislodged material to bypass the extruder.

14. The additive manufacturing system of claim 10, wherein the thermoplastic material is a first thermoplastic material, and the system further includes a vacuum pump that, when activated, is configured to supply a second thermoplastic material to the material container.

* * * * *